United States Patent
Bircann

(10) Patent No.: US 7,104,522 B2
(45) Date of Patent: Sep. 12, 2006

(54) COKING-RESISTANT SHAFT/BUSHING MECHANISM FOR AN EXHAUST GAS RECIRCULATION VALVE

(75) Inventor: Raul A. Bircann, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 43 days.

(21) Appl. No.: 10/641,558

(22) Filed: Aug. 15, 2003

(65) Prior Publication Data

US 2004/0065860 A1   Apr. 8, 2004

Related U.S. Application Data

(60) Provisional application No. 60/415,584, filed on Oct. 2, 2002.

(51) Int. Cl.
*F16K 31/44* (2006.01)

(52) U.S. Cl. .............. 251/214; 251/330; 123/568.11; 123/568.21; 123/568.26; 137/242; 137/244

(58) Field of Classification Search ........... 251/129.15, 251/214, 230, 355; 123/520, 568, 568.11, 123/568.18, 568.21, 568.23, 568.24, 568.25, 123/568.26; 137/242, 240, 244, 546
See application file for complete search history.

(56) References Cited

U.S. PATENT DOCUMENTS

| | | | | |
|---|---|---|---|---|
| 3,809,046 A | * | 5/1974 | Kammeraad | 123/188.9 |
| 4,061,157 A | * | 12/1977 | Hanssen | 137/242 |
| 4,075,296 A | * | 2/1978 | Orsini et al. | 261/41.5 |
| 5,249,773 A | * | 10/1993 | Feld | 251/129.11 |
| 5,617,892 A | * | 4/1997 | Pappas | 137/360 |
| 5,666,932 A | * | 9/1997 | Bauerle et al. | 123/568.21 |
| 6,439,213 B1 | | 8/2002 | Bircann et al. | |
| 6,453,934 B1 | | 9/2002 | Bircann et al. | |
| 6,467,754 B1 | | 10/2002 | Bircann et al. | |
| 6,484,705 B1 | | 11/2002 | Bircann et al. | |
| 6,492,751 B1 | * | 12/2002 | Ineson et al. | 310/71 |
| 6,497,226 B1 | | 12/2002 | Bircann et al. | |
| 6,543,746 B1 | | 4/2003 | Bircann et al. | |
| 6,634,346 B1 | | 10/2003 | Bircann et al. | |

* cited by examiner

*Primary Examiner*—Huyen Le
(74) *Attorney, Agent, or Firm*—Patrick M. Griffin

(57) ABSTRACT

An exhaust gas recirculation valve assembly including a bushing and pintle shaft sub-assembly having a pintle shaft supported by a sleeve bushing, the contact area between the shaft and bushing being reduced such that coking deposits that form on the remaining contact area can be broken by the force of the valve actuator, thereby preventing sticking of the valve from coking accumulations. Either the shaft surface or the bushing surface is relieved in a pattern of incuse areas and residual bearing areas. A currently preferred pattern is a helix.

6 Claims, 4 Drawing Sheets

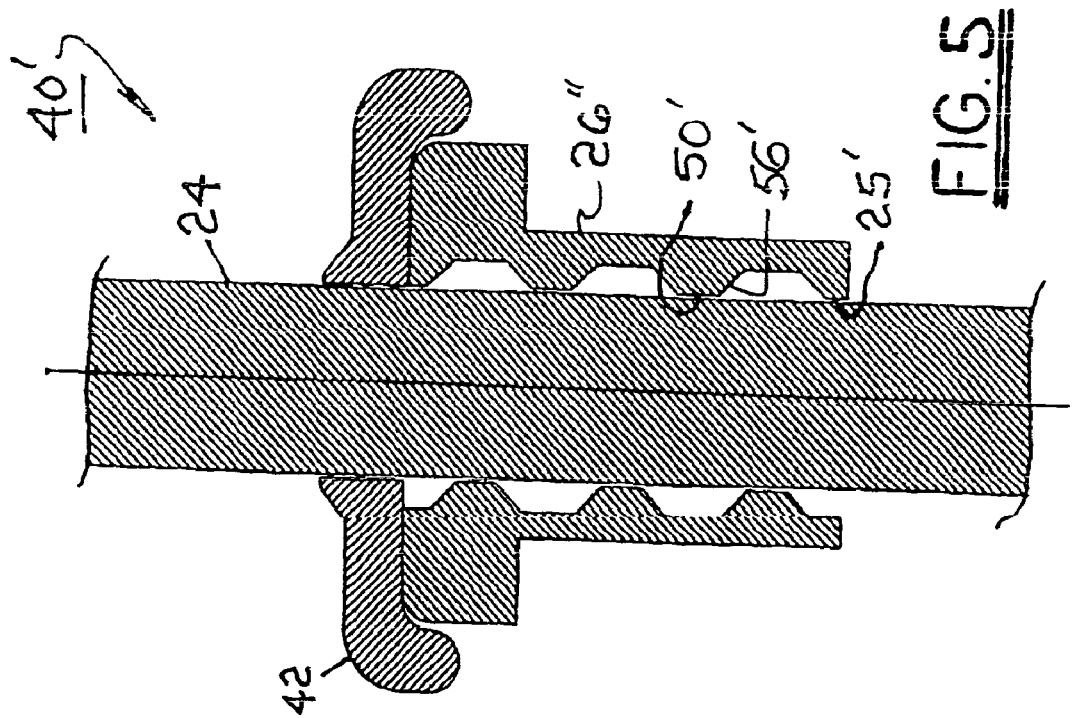
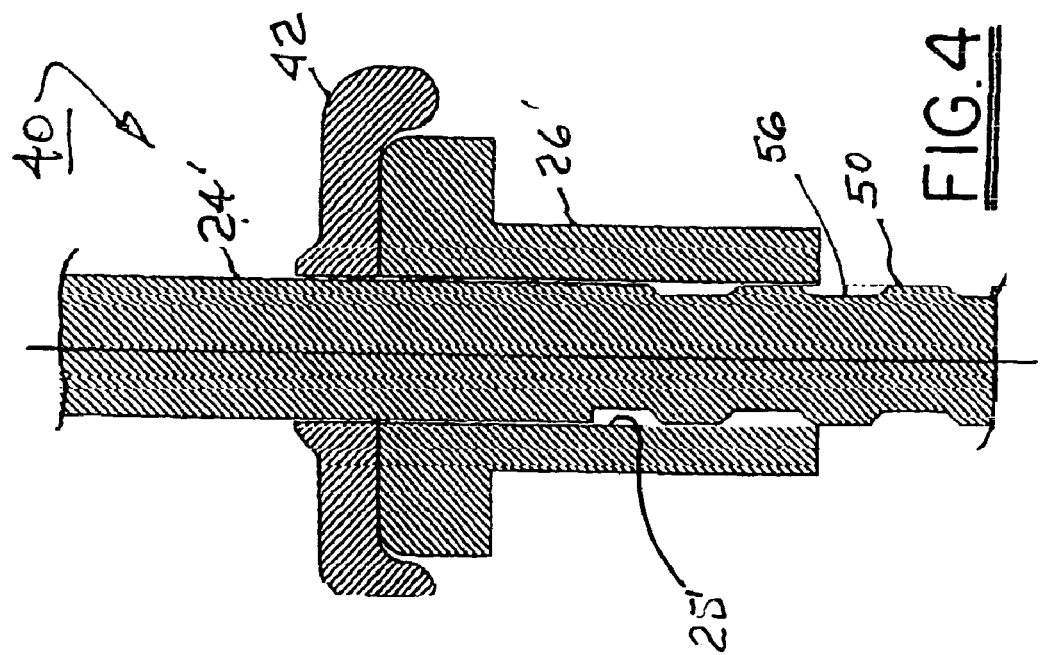

COKING-RESISTANT SHAFT/BUSHING MECHANISM FOR AN EXHAUST GAS RECIRCULATION VALVE

RELATIONSHIP TO OTHER APPLICATIONS AND PATENTS

The present application claims priority from U.S. Provisional Patent Application, Ser. No. 60/415,584, filed Oct. 2, 2002.

TECHNICAL FIELD

The present invention relates to pintle valves; more particularly, to exhaust gas recirculation (EGR) pintle valves for internal combustion engines; and most particularly, to an arrangement of the pintle shaft and the pintle bushing to prevent valve failure from shaft coking by exhaust gas components.

BACKGROUND OF THE INVENTION

Pintle valves are well known for use in controlling flow of fluids, and especially gases. Some applications can expose a valve's internal surfaces and moving parts to fouling materials which can give rise to deposits, resulting in impaired action or outright failure of the valve. In a particularly severe application, exhaust gas recirculation pintle valves on internal combustion engines are known to accumulate coking deposits on the pintle shaft in the region of the pintle support bushing. Having this area of the pintle unobstructed by coking deposits is a requirement for smooth, reliable action of the valve in controlling exhaust gas flow. In severe cases, coking is known to immobilize a pintle shaft in a bushing bore, resulting in complete failure of the valve.

It is known in the art to provide means for causing the pintle shaft to be scraped clean inherently by the axial motion of the shaft as the valve is exercised. Such means typically are disposed upstream of the sensitive area, such as a shaft bushing or a valve actuator.

U.S. Pat. No. 5,511,531, issued Apr. 30, 1996, discloses an annular scraper element 74 for the purpose of scraping off any residue that may accumulate on shaft 60 so that such residue is prevented from passing onto actuator 12. At its center, scraper element 74 has a circular hole with which shaft 60 has a close sliding fit. The radially outer margin of element 74 is captured such that it is constrained against any significant axial motion. A problem with such a scraper is that it represents essentially a line contact around the shaft, and any material that escapes past that line is then free to migrate or be deposited further along the shaft and/or within the actuator. Further, scraper element 74 has no radial resilience and is subject to wear with use, such that its scraping action becomes progressively less effective over time.

U.S. Pat. No. 4,253,642, issued Mar. 3, 1981, discloses an arrangement of wire bristles impinging radially on a valve pintle shaft "to clean threads or the like of the valve stem and remove debris therefrom." A problem with using wire bristles is that, while the shaft may be scrubbed thereby, the bristle pattern is entirely porous, allowing particulate-laden gases to permeate through and cause coking downstream of the bristles.

U.S. Pat. No. 6,212,881 B1, issued Apr. 10, 2001, discloses a "stopper" 72 having a central hole 72b through which the valve pintle shaft 56a passes. The diameter of the hole 72b is slightly larger than the diameter of shaft 56a. When the valve shaft is moved axially, the inner surface of the hole removes foreign matter such as deposits from the surface of the valve shaft. This is substantially the same line-contact scraper mechanism as is disclosed in U.S. Pat. No. 5,511,531 discussed above.

U.S. Pat. No. 5,666,932, issued Sep. 16, 1997, discloses a programmed feature of an engine start-up cycle wherein the EGR valve is violently opened and then slammed closed, which purports to jar or shear any contaminant buildup so as to reduce such buildup. No contact means is disclosed for actively scraping or otherwise mechanically removing contaminant buildup.

U.S. Pat. No. 4,408,627, issued Oct. 11, 1983, discloses a gate-type EGR valve operated by a linear actuator attached to a valve shaft. A pair of nylon scraper rings 28,29 are positioned around the valve shaft "to remove any carbon deposits" from the valve shaft and prevent them from entering the actuator. The rings are separated by a compressed coil spring which urges the rings against respective axial sealing faces in the valve body.

U.S. Pat. No. 4,061,157, issued Dec. 6, 1977, discloses a reciprocating valve having an outwardly facing conical surface disposed about the valve stem, which surface terminates in a knife-like edge that functions to remove accumulations of foreign material from exposed portions of the valve stem as it oscillates past the edge.

What is needed in the art is a means for limiting buildup of coking contaminants on a valve pintle shaft and/or shaft bushing to prevent immobilization of the shaft and failure of the valve.

It is a principal object of the present invention to increase the reliability of an exhaust gas recirculation valve by preventing unacceptable buildup of deposits on shaft and bearing surfaces thereof.

SUMMARY OF THE INVENTION

Briefly described, in an exhaust gas recirculation valve having a pintle shaft supported by a sleeve bushing, the contact area between the shaft and bushing is minimized such that coking deposits that form on the remaining contact area can be broken by the force of the valve actuator, thereby preventing sticking of the valve from coking accumulations. Either the shaft surface or the bushing surface is relieved in a pattern of incuse areas and residual areas. A currently preferred pattern is a helix.

BRIEF DESCRIPTION OF THE DRAWINGS

The present invention will now be described, by way of example, with reference to the accompanying drawings, in which:

FIG. 4 is a cross-sectional view like that shown in FIG. 3, showing the pintle shaft in extended position in the bushing;

FIG. 5 is a cross-sectional view showing a second embodiment in accordance with the invention.

DESCRIPTION OF THE PREFERRED EMBODIMENTS

Figure 1:
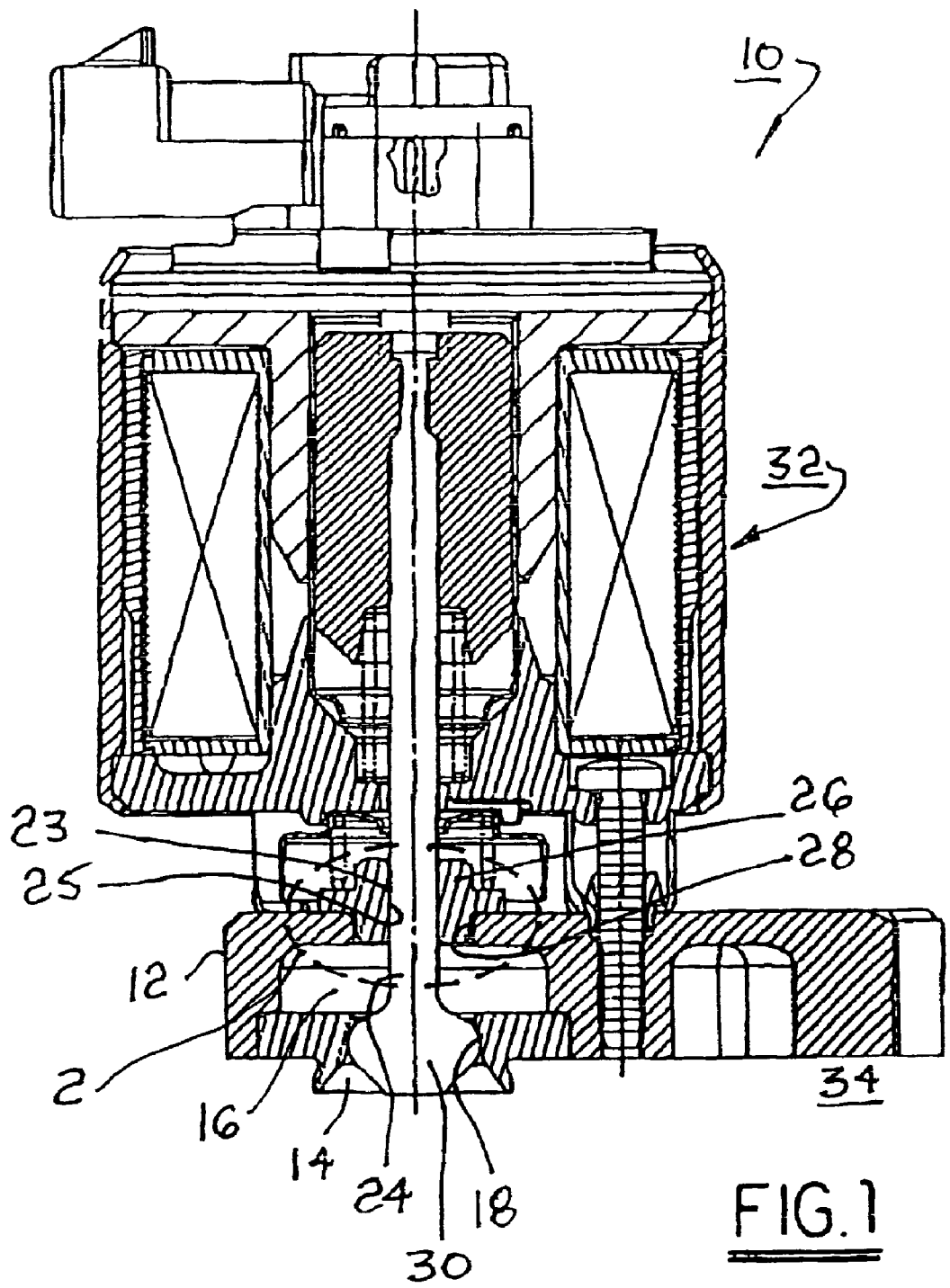
FIG. 1 is an elevational cross-sectional view of a prior art pintle-type valve.

Referring to FIG. 1, a prior art pintle-type valve 10 includes a valve body 12 comprising a first chamber 14 and a second chamber 16 separated by a first annular valve seat 18. A pintle shaft 24 having a surface 23 is slidably disposed in first axial bore 25 in bushing 26 which is mounted in a second axial bore 28 in valve body 12. Valve head 30 is fixedly attached to shaft 24 for non-rotational axial movement therewith and is matable with valve seat 18 to regulate flow across seat 18 between chambers 14 and 16 in response to actuation by solenoid actuator assembly 32.

A pintle valve such as valve 10 may be mounted on an internal combustion engine 34 for use as an exhaust gas recirculation valve in known fashion. In such use, chambers 14 and 16 are fully exposed to engine exhaust gases. The purpose of the invention is to prevent gases from chamber 16 from causing unacceptable levels of coking along shaft surface 23 within bushing bore 25, which surface is subject to reciprocation into and out of bushing 26 during operation of the valve.

While not essential to the invention, the following explanation for success of the invention is currently believed to be correct.

Coking products are chemical compounds similar to polymeric compounds in that they may be characterized in terms of shear strength and modulus. Shear strength is a fundamental property of a compound and may be used to determine a force required to break loose an assembly, such as a shaft in a bushing, which has seized due to formation of coking products at the shaft/bushing interface. The force required is a function of the shear strength of the coking material and also the total surface area clogged by coking. Further, the axial force available from a solenoid actuator assembly, such as assembly 32, may be readily determined. Hence, immobilization of a shaft in a bushing by coking may be prevented by limiting the area of shaft/bushing interface such that the shear resistance of the total coking products in that area can always be overcome by the solenoid actuator.

Limiting the area cannot be done, however, simply by shortening the axial extent of the shaft in the bushing because the axial bearing extent is what guides the valve head into the seat and prevents wobble and runout of the shaft in the bushing. Therefore, what is needed is a means for maintaining or even extending the axial length of the interface between the shaft and bushing while reducing very substantially the total interface area for debilitating accumulation of coking products.

Beneficially, it has been found that the shear strength of coking products is very much a function of thickness and diminishes dramatically in inverse proportion to thickness, especially beyond a very thin "skin layer" having a thickness of about 0.05 mm. Any buildup beyond the skin layer is crumbly and not very strong. Unfortunately, in prior art valves, the shaft clearance within the bushing bore is on the order of about 0.05 mm, such that prior art valves are easily choked by coking products.

Figure 3:
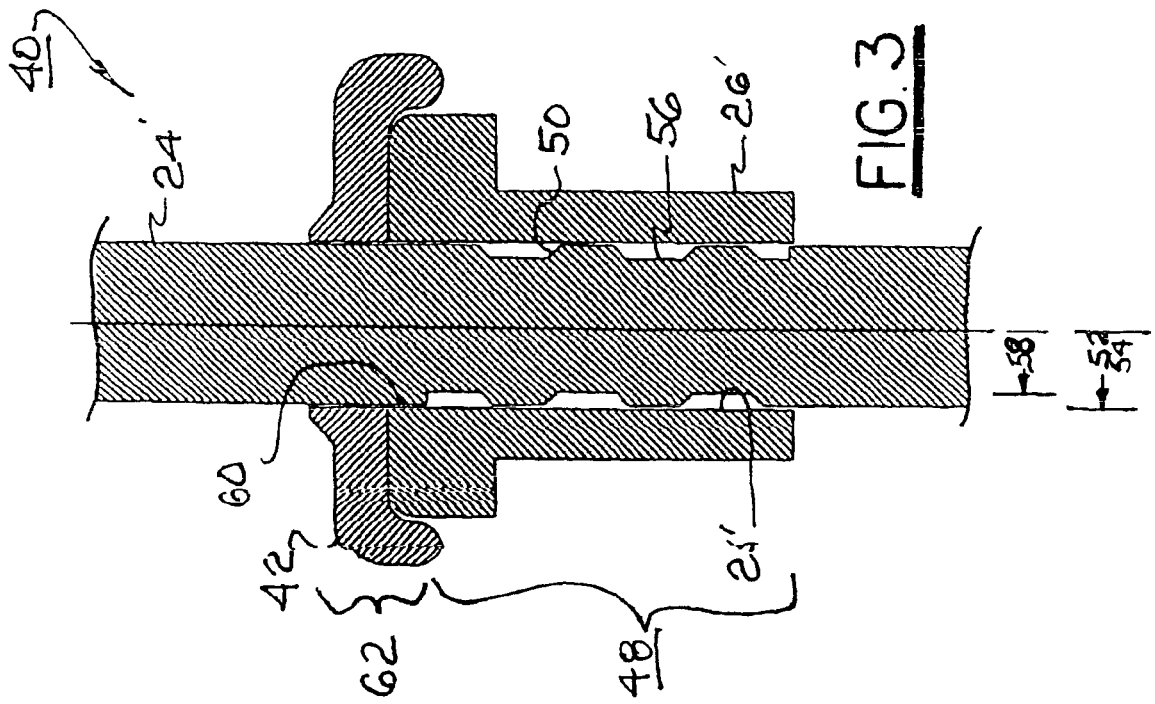
FIG. 3 is a cross-sectional view of the embodiment shown in FIG. 2, showing the pintle shaft in retracted position in the shaft bushing.
Figure 2:
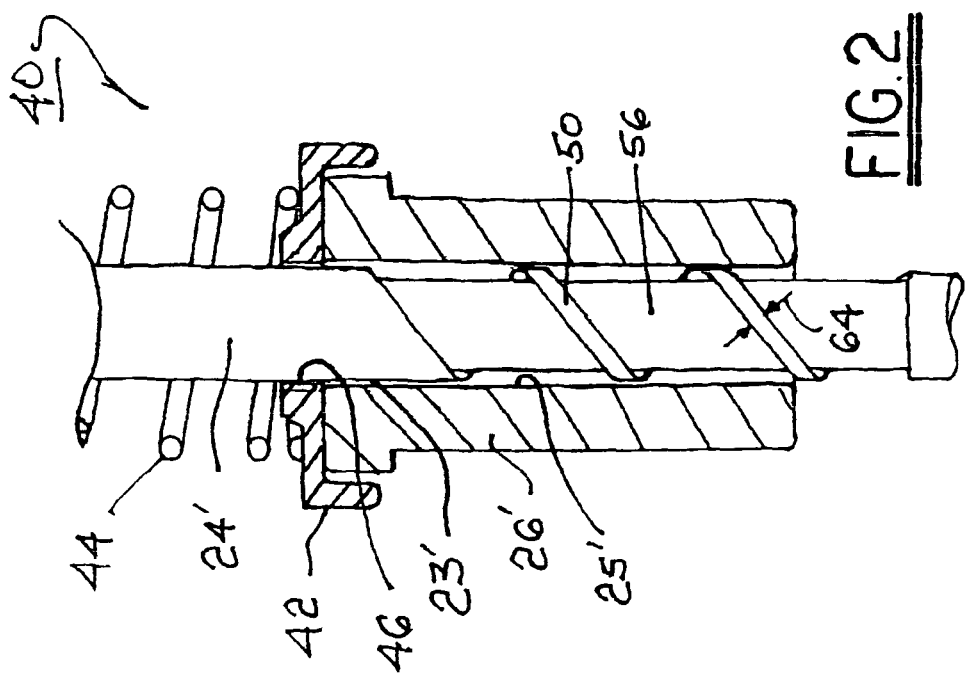
FIG. 2 is a detailed view of Area "2" shown in FIG. 1, in partial cross-section, showing an improved pintle shaft in accordance with a first embodiment of the invention.

Referring to FIGS. 2 and 3, a first embodiment of a bushing and pintle shaft sub-assembly 40 in accordance with the invention is suitable for substitution into a prior art valve assembly such as assembly 10. First embodiment 40 comprises a pintle bushing 26'. An improved pintle shaft 24' is disposed conventionally for axial actuation within bore 25' in bushing 26'. A bushing cap 42 is urged against bushing 26' by a hookian element such as coil spring 44. A central aperture 46 in cap 42 is close-fitting to surface 23' of pintle shaft 24' to minimize escape of gases along bearing bore 25'.

Referring to FIG. 3, a first portion 48 of surface 23' within bore 25' and below aperture 46 is relieved to define residual bearing areas 50 having a first radius 52 equal to the original radius 54 of shaft 24', and incuse areas 56 having a second radius 58 less than first radius 52. A second portion 60 of surface 23' within bore 25' is unrelieved to provide for sealability of the shaft in the bushing, in cooperation with cap 42. Preferably, the axial length 62 of portion 60 is less than or equal to the shaft diameter (twice radius 52).

In a currently preferred embodiment, residual bearing area 50 defines a clockwise helical pattern or "thread" having a relatively long pitch. Further, the helical width 64 of the residual area 50 is preferably relatively narrow, to provide radial support for shaft 24' in bore 25' while simultaneously minimizing the surface of residual bearing area 50 available for coking build-up. Further, the helical nature of area 50, being inclined to the path of axial travel of the pintle shaft, acts inherently to plow coking deposits from the surface of the bearing bore during actuation; and the helical pattern, being open at the inboard end of the bushing, permits scraped deposits to escape back into valve chamber 16 from whence they are swept by the flow of gases through the valve.

Coking products should be expected to accumulate in incuse areas 56; however, because the depth of such areas exceeds the thickness of a skin layer, such crumbly and incompetent accumulations are inconsequential to causing the shaft to become immobilized in the bushing.

Referring to FIG. 4, shaft 24' continues to be fully supported by bushing bore 25' when the shaft is fully extended at valve closure, as shown in FIG. 1.

Referring to FIG. 5, in a second embodiment of a bushing and pintle shaft sub-assembly 40' in accordance with the invention, incuse portions 56' and residual bearing portions 50' are formed in the bore 25' of bushing 26" rather than in the pintle shaft 24 which may be smooth and unfeatured as in prior art pintle shaft 24.

In FIGS. 3–5, a cap spring 44 is assumed, but omitted for clarity.

Figure 6:
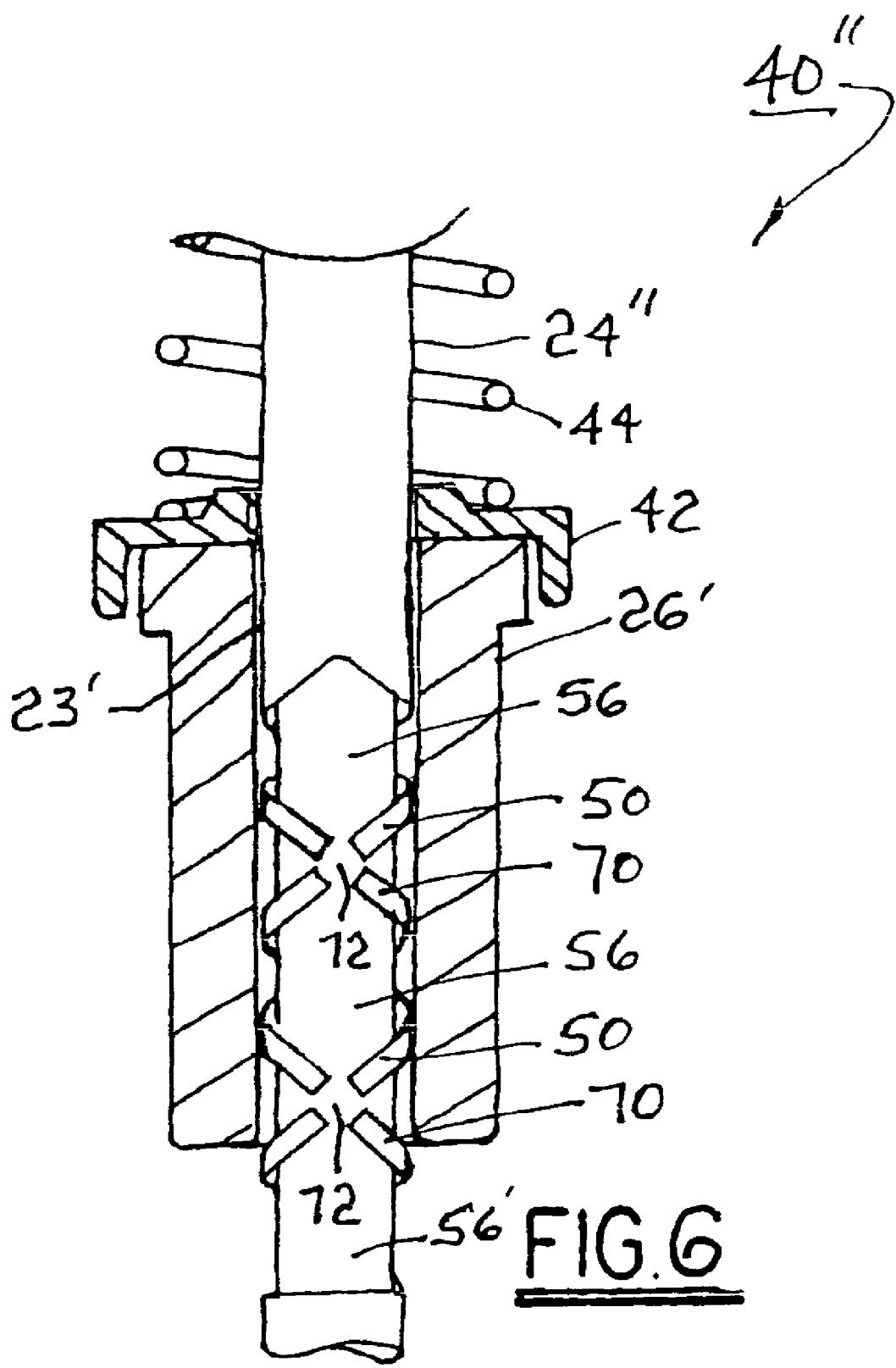
FIG. 6 is a view like that shown in FIG. 2, showing a third embodiment in accordance with the invention.

Referring to FIGS. 2 and 6, a result of the helical arrangement shown in FIG. 2 is that a torque may be imposed on pintle shaft 24' during actuation. Such torque may be beneficial, causing the shaft to rotate and thereby progressively clean the entire smooth bearing surface during repeated actuations. In applications wherein no rotation is desired, in a third embodiment 40" as shown in FIG. 6, a second opposite-handed helical residual bearing area 70 may also be provided such that there is no net torque on pintle shaft 24" during actuation. Preferably, the helical crossings 72 are open to provide circulation of gases and drainage of deposits along the incuse areas 56. An important consideration in providing a double-helix arrangement such as is shown in FIG. 6 is to continue to minimize the total residual area 50,70 made available to coking, and to keep such total area small enough that the shear resistance of the accumulated coking deposits cannot exceed the axial strength of the actuator.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A coking-resistant bushing and pintle shaft sub-assembly for use in an exhaust gas recirculation valve for an internal combustion engine for controlling flow of a gas stream, comprising:
   a) a bushing having a bore therethrough; and
   b) a pintle shaft reciprocally disposed in said bore non-rotational axial movement and comprising a portion adapted to extend into the gas stream, said portion having an outer surface,
   wherein said outer surface is at least partially relieved radially to define at least one residual bearing area for radially supporting said shaft in said bushing, and further wherein said residual bearing area is formed in a helical shape.

2. A sub-assembly in accordance with claim 1 wherein said pintle-type valve assembly includes a solenoid actuator assembly, and wherein the total area of said residual bearing area is selected such that coking deposits formed thereupon during use of said pintle-type valve are sheared by the actuating force of said solenoid actuator.

3. A sub-assembly in accordance with claim 1 wherein said residual bearing area is formed in a shape comprising both a clockwise helix and a counterclockwise helix.

4. A sub-assembly in accordance with claim 1 wherein said radially relieved areas have a radial depth of at least 0.05 mm.

5. A coking-resistant pintle-type valve assembly for an exhaust gas recirculation valve for an internal combustion engine controlling flow of a gas stream, comprising:
   a) a valve body including an internal chamber for receiving the gas stream;
   b) a bushing disposed in a first bore in said valve body and having a second bore extending between said chamber and the exterior of said valve body;
   c) a valve pintle shaft axially reciprocally disposed in said second bore and comprising a portion extending into said chamber, said portion having a shaft surface, and
   a solenoid actuator assembly adapted to axially move said valve pintle shaft relative to said bushing;
   wherein said shaft surface is at least partially relieved radially to define at least one residual bearing area for radially supporting said shaft in said bushing, and further wherein said residual bearing area is formed in a helical shape.

6. An internal combustion engine, comprising a coking-resistant pintle-type exhaust gas recirculation valve assembly for controlling flow of an exhaust gas stream, said pintle-type exhaust gas recirculation valve assembly comprising
   a valve body including an internal chamber for receiving said exhaust gas stream,
   a bushing disposed in a first bore in said valve body and having a second bore extending between said chamber and the exterior of said valve body, and
   a valve pintle shaft axially reciprocally disposed in said second bore and comprising a portion extending into said chamber, said portion having a shaft surface,
   wherein said shaft surface is at least partially relieved radially to define at least one residual bearing area for radially supporting said shaft in said bushing, and further wherein said residual bearing area is formed in a helical shape.

* * * * *